United States Patent
Kanayama

(10) Patent No.: US 11,150,515 B2
(45) Date of Patent: Oct. 19, 2021

(54) IMAGE DISPLAY DEVICE AND METHOD FOR CONTROLLING SAME

(71) Applicant: NICHIA CORPORATION, Anan (JP)

(72) Inventor: Michinao Kanayama, Yoshinogawa (JP)

(73) Assignee: NICHIA CORPORATION, Anan (JP)

(*) Notice: Subject to any disclaimer, the term of this patent is extended or adjusted under 35 U.S.C. 154(b) by 0 days.

(21) Appl. No.: 16/815,007

(22) Filed: Mar. 11, 2020

(65) Prior Publication Data
US 2020/0301206 A1   Sep. 24, 2020

(30) Foreign Application Priority Data
Mar. 20, 2019 (JP) ............................. JP2019-052346

(51) Int. Cl.
*G02F 1/13357* (2006.01)
*G02F 1/133* (2006.01)
*G02F 1/137* (2006.01)

(52) U.S. Cl.
CPC ........ *G02F 1/133611* (2013.01); *G02F 1/137* (2013.01); *G02F 1/13306* (2013.01); *G02F 1/133603* (2013.01); *G02F 1/133605* (2013.01)

(58) Field of Classification Search
CPC ......... G02F 1/133611; G02F 1/133605; G02F 1/133603; G02F 1/133601; G02F 1/13306; G02F 1/137; G09G 2320/0233; G09G 2320/0285; G09G 2320/0646; G09G 3/3426; G09G 3/3648; G09G 3/342
See application file for complete search history.

(56) References Cited

U.S. PATENT DOCUMENTS

| | | | |
|---|---|---|---|
| 2006/0290627 A1 | 12/2006 | Konno et al. | |
| 2009/0207114 A1* | 8/2009 | Terasaka | G09G 3/3648 345/89 |
| 2010/0045694 A1* | 2/2010 | Tanaka | G09G 3/342 345/589 |
| 2011/0102452 A1* | 5/2011 | Yun | G09G 3/342 345/589 |

(Continued)

FOREIGN PATENT DOCUMENTS

| | | |
|---|---|---|
| JP | 2007-003805 | 1/2007 |
| JP | 2011-095714 | 5/2011 |

(Continued)

*Primary Examiner* — Michael H Caley
*Assistant Examiner* — Jonathan Y Jung
(74) *Attorney, Agent, or Firm* — Mori & Ward, LLP

(57) ABSTRACT

An image display device includes a circuit board having a surface, partitioning members provided on the surface of the circuit board, a discontinuous portion formed between the partitioning members, light-emitting elements provided on the surface of the circuit board, a liquid crystal panel provided on the partitioning members so that the partitioning members are provided between the liquid crystal panel and the surface of the circuit board, and a control circuit. At least one of the light-emitting elements is provided in each of the partitioning members to be surrounded by each of the partitioning members which is configured to reflect light emitted from the at least one of the light-emitting elements. The control circuit is configured to control the liquid crystal panel to improve uneven light distributions of the light-emitting elements caused by the discontinuous portion.

13 Claims, 12 Drawing Sheets

(56) References Cited

U.S. PATENT DOCUMENTS

| | | | | |
|---|---|---|---|---|
| 2011/0157242 A1* | 6/2011 | Wang | ................... | G09G 3/3426 |
| | | | | 345/690 |
| 2011/0267563 A1* | 11/2011 | Shimizu | ................. | G02B 6/008 |
| | | | | 349/65 |
| 2014/0204575 A1* | 7/2014 | Jo | ..................... | G02F 1/133555 |
| | | | | 362/235 |

FOREIGN PATENT DOCUMENTS

| | | |
|---|---|---|
| JP | 2011-124196 | 6/2011 |
| JP | 2012-138255 | 7/2012 |
| JP | 2013-029573 | 2/2013 |
| JP | 2013-068905 | 4/2013 |
| JP | 2017-157278 | 9/2017 |

* cited by examiner

IMAGE DISPLAY DEVICE AND METHOD FOR CONTROLLING SAME

CROSS-REFERENCE TO RELATED APPLICATIONS

This application is based upon and claims the benefit of priority from the prior Japanese Patent Application No. 2019-052346, filed on Mar. 20, 2019; the entire contents of which are incorporated herein by reference.

FIELD

Embodiments relate to an image display device and a method for controlling the same.

BACKGROUND

A surface light source that uses multiple light-emitting elements is used as a backlight of an image display device. As recited in JP-A 2013-68905 (Kokai), there is technology of performing local dimming control of the surface light source for the backlight to improve the contrast of the image displayed by the image display device. For an image display device having local dimming control as well, it is desirable to improve image quality even more.

SUMMARY

An image display device according to an embodiment of the invention includes a circuit board; light-emitting elements mounted on the circuit board; partitioning members reflecting light emitted from the light-emitting elements and forming spaces on the circuit board, one or more of the light-emitting elements being provided in each of the spaces to be surrounded by each of the partitioning members; a discontinuous portion formed between the partitioning members; a liquid crystal panel provided on the partitioning members and on the discontinuous portion; and A control circuit configured to control the liquid crystal panel to reduce an effect of the discontinuous portion on a light distribution of the light-emitting elements.

A method for controlling an image display device according to an embodiment of the invention includes providing partitioning members on a surface of a circuit board to have discontinuous portions between the partitioning members; providing light-emitting elements on the surface of the circuit board, at least one of the light-emitting elements being provided in each of the partitioning members to be surrounded by each of the partitioning members which is configured to reflect light emitted from the at least one of the light-emitting elements; providing a liquid crystal panel on the partitioning members to produce an image display device, the partitioning members being provided between the liquid crystal panel and the surface of the circuit board; and controlling the liquid crystal panel to improve uneven light distributions of the light-emitting elements caused by the discontinuous portion.

An image display device according to another embodiment of the invention includes a circuit board having a surface; partitioning members provided on the surface of the circuit board; a discontinuous portion formed between the partitioning members; light-emitting elements provided on the surface of the circuit board, at least one of the light-emitting elements being provided in each of the partitioning members to be surrounded by each of the partitioning members which is configured to reflect light emitted from the at least one of the light-emitting elements; a liquid crystal panel provided on the partitioning members so that the partitioning members are provided between the liquid crystal panel and the surface of the circuit board; and a control circuit configured to control the liquid crystal panel to improve uneven light distributions of the light-emitting elements caused by the discontinuous portion.

DETAILED DESCRIPTION

First Embodiment

Figure 1A:
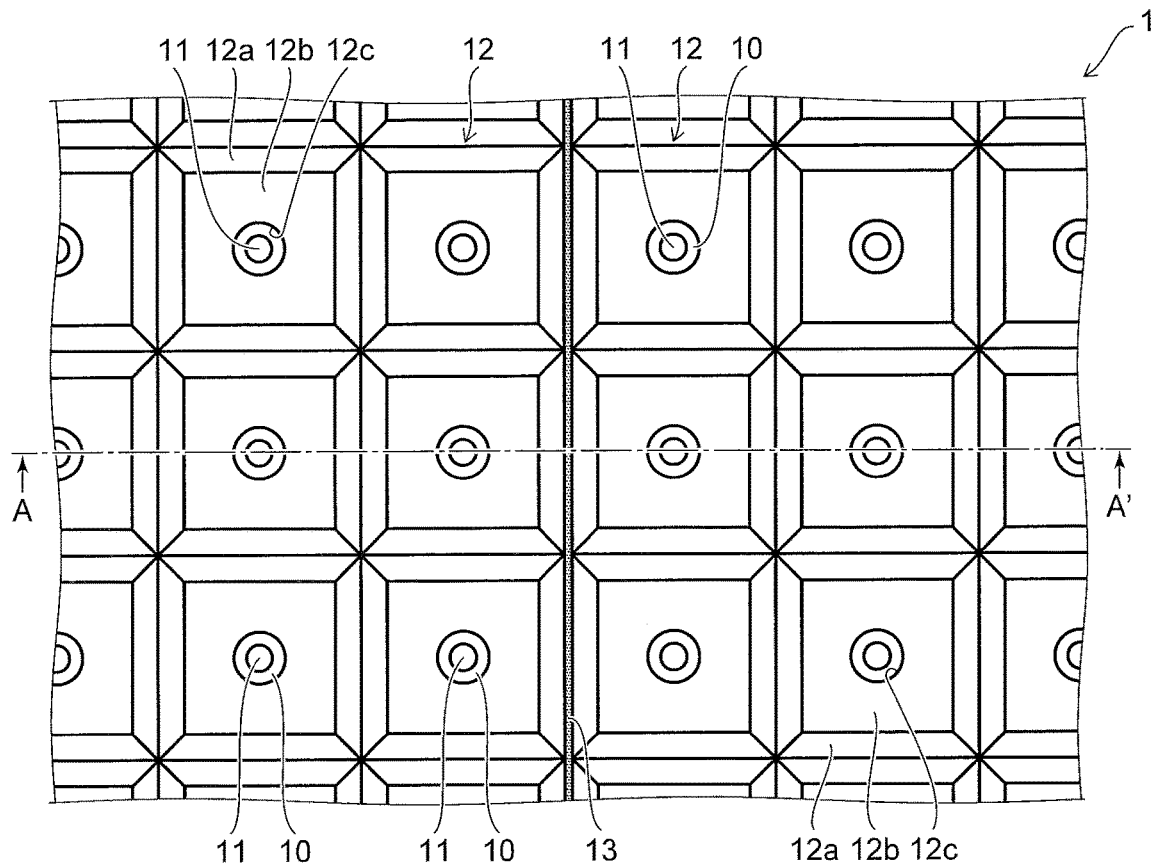
FIG. 1A is a plan view showing partitioning members and light-emitting elements of an image display device according to a first embodiment.
Figure 1B:
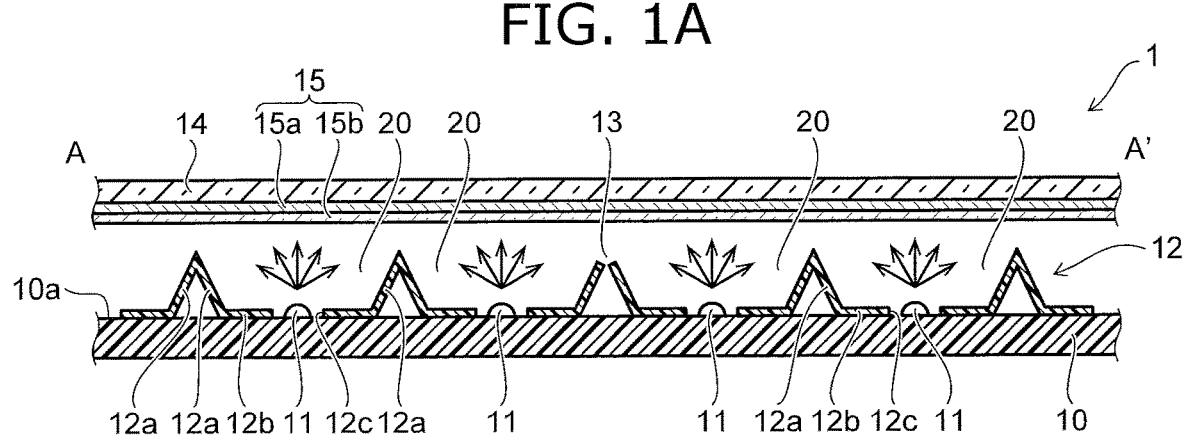
FIG. 1B is an end view along line A-A' shown in FIG. 1A.
Figure 2:
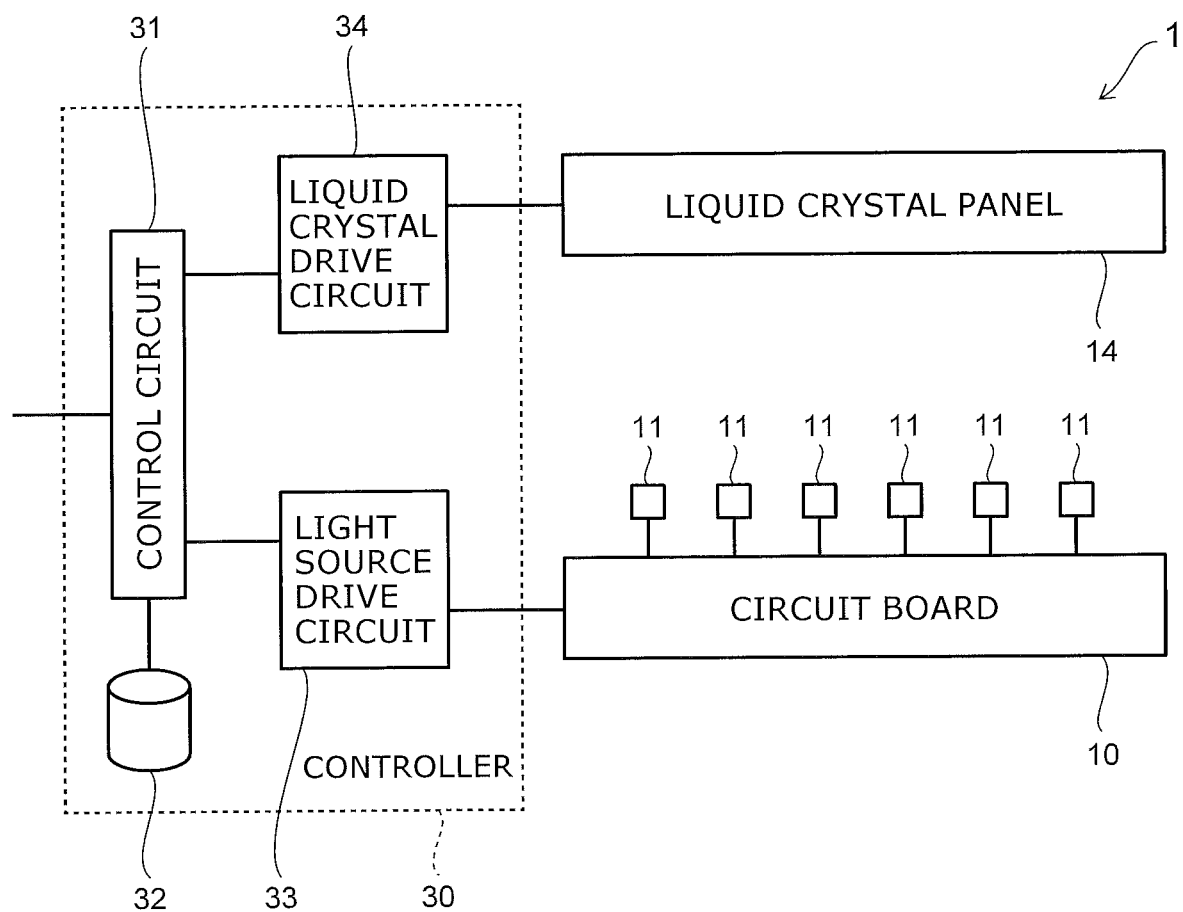
FIG. 2 is a block diagram showing an image display device according to the first embodiment.

As shown in FIG. 1A, FIG. 1B, and FIG. 2, an image display device 1 according to the embodiment includes: a circuit board 10; multiple light-emitting elements 11 mounted on the circuit board 10; multiple partitioning members 12 reflecting light emitted from the light-emitting elements 11 and forming multiple spaces 20 on the circuit board 10 so that each of the spaces 20 encloses one or more of the light-emitting elements 11; a discontinuous portion 13 formed between the multiple partitioning members 12; a liquid crystal panel 14 provided on the multiple partitioning members 12 and on the discontinuous portion 13; and a control circuit 31 controlling the liquid crystal panel 14 to reduce an effect of the discontinuous portion 13 on the light distribution of the multiple light-emitting elements 11.

Details will now be described.

As shown in FIG. 1A and FIG. 1B, the circuit board 10 is provided in the image display device 1. The multiple light-emitting elements 11 are mounted on a front surface 10a of the circuit board 10. The light-emitting elements 11 are arranged regularly in a matrix configuration. Electrical power from the circuit board 10 is supplied to the light-emitting elements 11. The light-emitting elements 11 are, for example, LEDs (Light Emitting Diodes) emitting white light. In the specification, directions parallel to the front surface 10a of the circuit board 10 also are called "horizontal directions".

The multiple partitioning members 12 are arranged along the horizontal directions on the circuit board 10. The gap between adjacent partitioning members 12 is the discontinuous portion 13. For example, the partitioning members 12 are arranged in one column along a horizontal direction; and the discontinuous portion 13 has a line configuration when viewed in top-view. The discontinuous portion 13 is marked with hatching in FIG. 1A to clearly show the position of the discontinuous portion 13. This is similar for the other plan views described below as well.

Although each of the partitioning members 12 has a plate configuration as an entirety, unevennesses are provided to form the space 20 at each of the light-emitting elements 11. Although the direction from the circuit board 10 toward the partitioning members 12 is called "up" and the reverse direction is called "down" in the specification, these expressions are for convenience and are independent of the direction of gravity.

In the partitioning members 12, a wall 12a is provided in a lattice configuration; and bottom plates 12b are provided at the portions surrounded with the wall 12a. The configurations of the bottom plates 12b are rectangles; and the bottom plates 12b contact the front surface 10a of the circuit board 10. Openings 12c are formed at the centers of the bottom plates 12b. One light-emitting element 11 is disposed in each of the openings 12c. The wall 12a is continuous with the edges of the bottom plates 12b and is tilted upward and away from the most proximal of the light-emitting elements 11 in the horizontal direction.

The spaces 20 are formed by the wall 12a and the bottom plates 12b. The partitioning member 12 forms multiple spaces 20. The configuration of each of the spaces 20 is, for example, an inverted truncated quadrilateral pyramid having an open upper surface. For example, each of the spaces 20 encloses one light-emitting element 11. As described in fourth and fifth embodiments described below, each of the spaces 20 may enclose two or more light-emitting elements 11. The partitioning member 12 is white and reflects the light emitted from the light-emitting elements 11. For example, the partitioning member 12 is formed to have a continuous body of a white resin material. The discontinuous portion 13 between the partitioning members 12 is positioned between the spaces 20, that is, between the uppermost portions of the walls 12a.

The partitioning member 12 is formed by a method such as injection molding, pressing, etc. Because the partitioning member 12 has a plate configuration as an entirety, warp and/or waviness increases as the size when forming increases; and there is a risk that the light emission quality of the image display device 1 may be affected. Therefore, when forming the partitioning member 12, it is necessary to set the size to suppress the warp and/or waviness so that the light emission quality of the image display device 1 is not affected. Accordingly, in the case where the size of the image display device 1 is large, it is necessary to place multiple partitioning members 12 on the circuit board 10; but a gap may occur between the adjacent partitioning members 12 due to the precision of the exterior form size of the partitioning member 12 and the assembly error. The gap is the discontinuous portion 13.

The liquid crystal panel 14 is provided on the multiple partitioning members 12 and on the discontinuous portion 13. Multiple pixels are provided in the liquid crystal panel 14; and the transmittance for the light is controllable for each pixel. The size of the space 20 in the horizontal direction is, for example, 1 to 2 cm and is much larger than the size of the pixel. In the horizontal direction, several hundred pixels oppose one space 20. When viewed in top-view, several tens of thousands of pixels oppose one space 20.

An optical sheet 15 is included between the liquid crystal panel 14 and the partitioning members 12. For example, a prism sheet 15a and a diffusion sheet 15b are stacked in the optical sheet 15. The optical sheet 15 may include sheets other than the prism sheet 15a and the diffusion sheet 15b. Although the optical sheet 15 and the partitioning members 12 are drawn as being greatly separated for convenience of illustration in FIG. 1B, the gap between the partitioning members 12 and the optical sheet 15 may be smaller; and the partitioning members 12 may contact the optical sheet 15. Multiple prism sheets 15a and multiple diffusion sheets 15b may be included according to the necessary optical performance. This is similar for the other end views described below as well.

As shown in FIG. 2, a controller 30 is provided in the image display device 1. The control circuit 31, a memory part 32, a light source drive circuit 33, and a liquid crystal drive circuit 34 are provided in the controller 30. An image signal is input to the control circuit 31 from the outside. Information that relates to the position of the discontinuous portion 13 is stored in the memory part 32. The light source drive circuit 33 individually controls the light-emitting elements 11 via the circuit board 10 based on the control signal output from the control circuit 31. The liquid crystal drive circuit 34 controls the transmittance for the light of the pixels of the liquid crystal panel 14 based on the control signal output from the control circuit 31.

A method for controlling the image display device 1 according to the embodiment will now be described.

Figure 3:
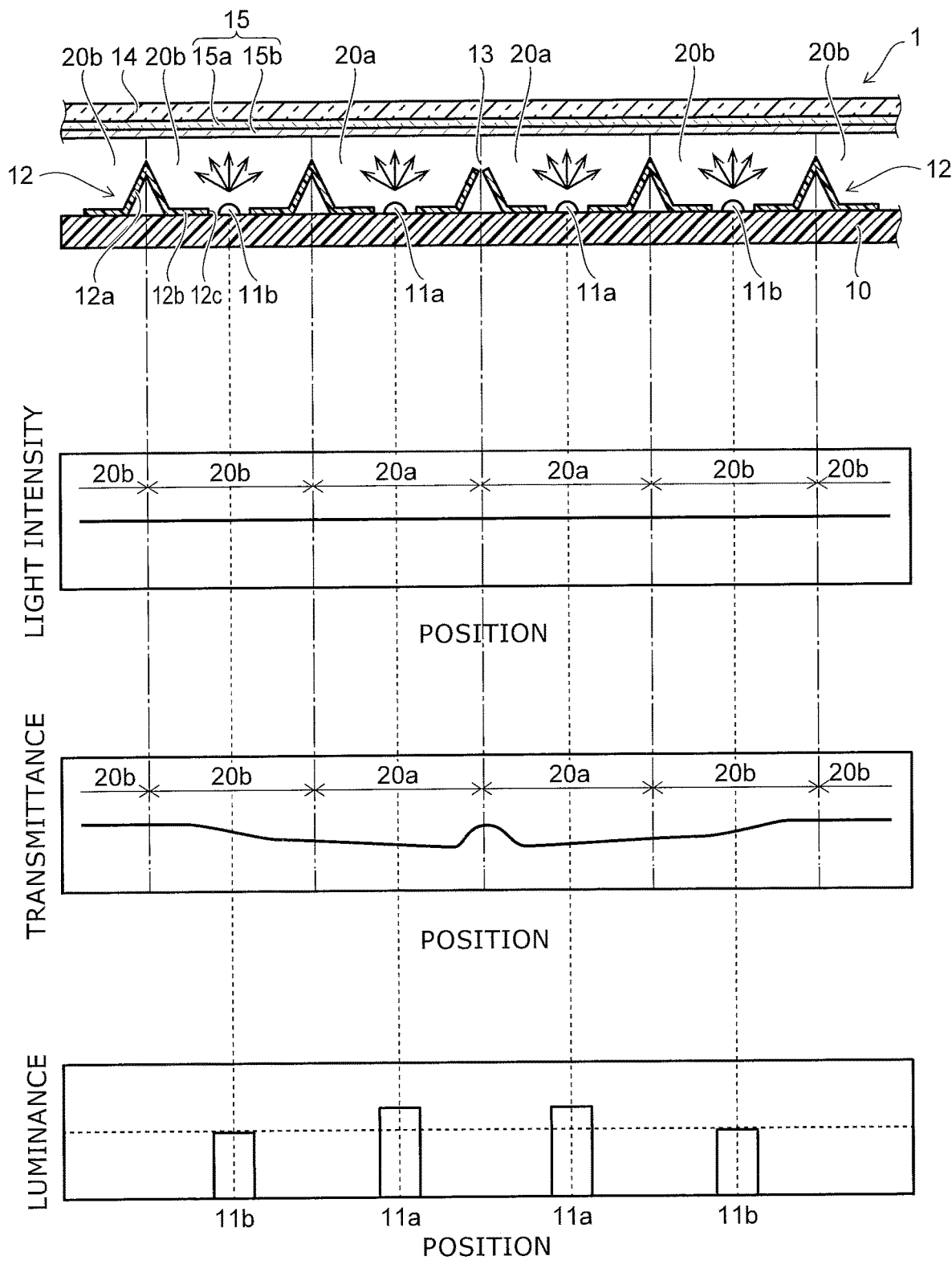
FIG. 3 shows a method for controlling the image display device according to the first embodiment, in which the horizontal axis is position, and the vertical axis is intensity of light emitted from the image display device, transmittance for light of pixels of a liquid crystal panel, and luminance of the light-emitting elements.

FIG. 3 shows the method for controlling the image display device according to the embodiment, in which the horizontal axis is the position, and the vertical axis is the intensity of the light emitted from the image display device, the transmittance for the light of the pixels of the liquid crystal panel, and the luminance of the light-emitting elements. The end view of the image display device 1 also is shown in FIG. 3.

The light-emitting elements 11 emit light when the control circuit 31 controls the light source drive circuit 33, and the light source drive circuit 33 supplies electrical power to the light-emitting elements 11 via the circuit board 10. A portion of the light emitted from the light-emitting elements 11 is directly incident on the optical sheet 15; and another portion of the light is incident on the optical sheet 15 by being reflected by the partitioning members 12. The light that is incident on the optical sheet 15 passes through the optical sheet 15 and the liquid crystal panel 14 and is emitted externally.

In such a case, because the partitioning member 12 forms the spaces 20 enclosing the light-emitting elements 11, the greater part of the light emitted from one light-emitting element 11 is incident on the pixels opposing the space 20 surrounding the one light-emitting element 11. On the other hand, in the space 20, the light that is emitted from the light-emitting element 11 is reflected by the wall 12a and the bottom plate 12b of the partitioning member 12 and diffused by the diffusion sheet 15b; therefore, the intensity of the light incident on the liquid crystal panel 14 is substantially uniform. Therefore, by controlling the luminances of the light-emitting elements 11 individually, the brightness which is the reference of the region opposing the space 20 can be controlled for each space 20 in the liquid crystal panel 14.

When the image signal is input to the control circuit 31 from the outside, the control circuit 31 controls the transmittances for the light of the pixels of the liquid crystal panel 14 (hereinbelow, also called simply the "transmittance") by controlling the liquid crystal drive circuit 34. Thereby, the image can be displayed by the liquid crystal panel 14. When a dark region exists in the image, the control circuit 31 reduces the luminances of the light-emitting elements 11 corresponding to the dark region by controlling the light source drive circuit 33, and changes the transmittances of the pixels in combination with the luminances of the light-emitting elements 11 by controlling the liquid crystal drive circuit 34. As a result, even in a dark region of the image, the gradation can be represented finely; the darkest region can be displayed to be darker; and the contrast of the image improves.

The effects of the discontinuous portion 13 on the display image and countermeasures for the effects will now be described.

Because the partitioning member 12 is not disposed at the discontinuous portion 13, the light that is incident on the region of the liquid crystal panel 14 opposing the discontinuous portion 13 is less than that of the other regions. Therefore, unless some kind of countermeasure is taken, the region of the liquid crystal panel 14 opposing the discontinuous portion 13 will be darker than the surroundings, and undesirably will be perceived as a stripe-shaped unevenness.

Therefore, in the image display device 1, a correction is performed to eliminate or reduce the stripe-shaped unevenness caused by the discontinuous portion 13. The control circuit 31 of the controller 30 controls the light-emitting elements 11 and the liquid crystal panel 14 to reduce the effects of the discontinuous portion 13 on the light distribution of the multiple light-emitting elements 11.

The correction method will now be described in detail.

The control circuit 31 refers to the information stored in the memory part 32 and confirms the position of the discontinuous portion 13. Then, the control circuit 31 increases, via the light source drive circuit 33 and the circuit board 10, the luminances of the light-emitting elements 11 positioned in the spaces 20 disposed at the positions sandwiching the discontinuous portion 13. In FIG. 3, the spaces 20 that are disposed at the positions sandwiching the discontinuous portion 13 are taken as "spaces 20a"; and the other spaces 20 are taken as "spaces 20b". The light-emitting elements 11 that are disposed in the spaces 20a are taken as "light-emitting elements 11a"; and the light-emitting elements 11 that are disposed in the spaces 20b are taken as "light-emitting elements 11b". The space 20a contacts the discontinuous portion 13; and the space 20a is interposed between the space 20b and the discontinuous portion 13. The light-emitting elements 11a are disposed at vicinities of the discontinuous portion 13; and the discontinuous portion 13 is sandwiched between adjacent light-emitting elements 11a.

Via the liquid crystal drive circuit 34, the control circuit 31 reduces the transmittances for the light of the pixels of the liquid crystal panel 14 opposing the spaces 20a. Also, the transmittances of the pixels opposing the discontinuous portion 13 are set to be higher than the transmittances of the pixels opposing the spaces 20a.

Thereby, the region of the display image opposing the discontinuous portion 13 can be suppressed from being darker than the other regions by increasing the luminances of the light-emitting elements 11a. On the other hand, because the transmittances of the pixels in the region opposing the spaces 20a are reduced, the effects of increasing the luminances of the light-emitting elements 11a can be canceled. Thus, the stripe-shaped unevenness that is caused by the discontinuous portion 13 is eliminated or reduced; and the intensity distribution of the light emitted from the liquid crystal panel 14 is uniform. As a result, the quality of the display image improves.

Comparative Example

Figure 4:
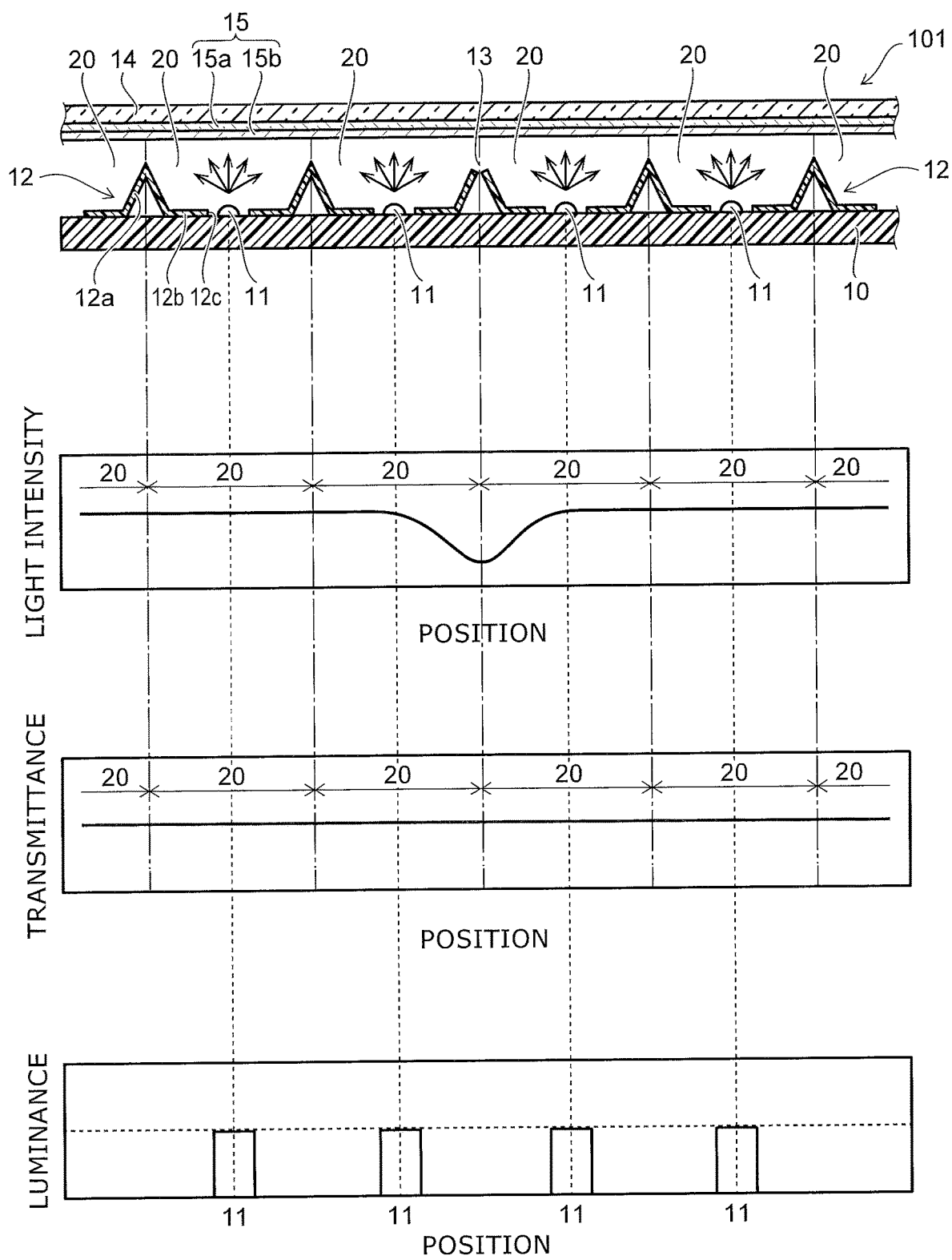
FIG. 4 shows a method for controlling an image display device according to a comparative example, in which the horizontal axis is position, and the vertical axis is intensity of light emitted from the image display device, transmittance for light of pixels of a liquid crystal panel, and luminance of the light-emitting elements.

FIG. 4 shows a method for controlling an image display device according to a comparative example, in which the horizontal axis is the position, and the vertical axis is the intensity of the light emitted from the image display device, the transmittance for the light of the pixels of the liquid crystal panel, and the luminance of the light-emitting elements. The end view of the liquid crystal display device 101 also is shown in FIG. 4.

In the liquid crystal display device 101 according to the comparative example, the configurations of the circuit board 10, the light-emitting element 11, the partitioning member 12, the discontinuous portion 13, the liquid crystal panel 14, and the optical sheet 15 are similar to those of the first embodiment. In the comparative example, a countermeasure such as that of the first embodiment is not performed for the effects of the discontinuous portion 13 on the display image.

Namely, as shown in FIG. 4, the luminances of the light-emitting elements 11 are set to be uniform. Although the transmittances for the light of the pixels of the liquid crystal panel 14 are controlled according to the display image, the transmittances of the pixels also are set to be uniform when the brightness of the display image is uniform. Because the region of the liquid crystal panel 14 opposing the discontinuous portion 13 does not oppose the partitioning member 12, the intensity of the light emitted from this region is lower than that of the surroundings. As a result, in the display image, the position that opposes the discontinuous portion 13 is dark and is undesirably perceived as a stripe-shaped unevenness.

Second Embodiment

Figure 5A:
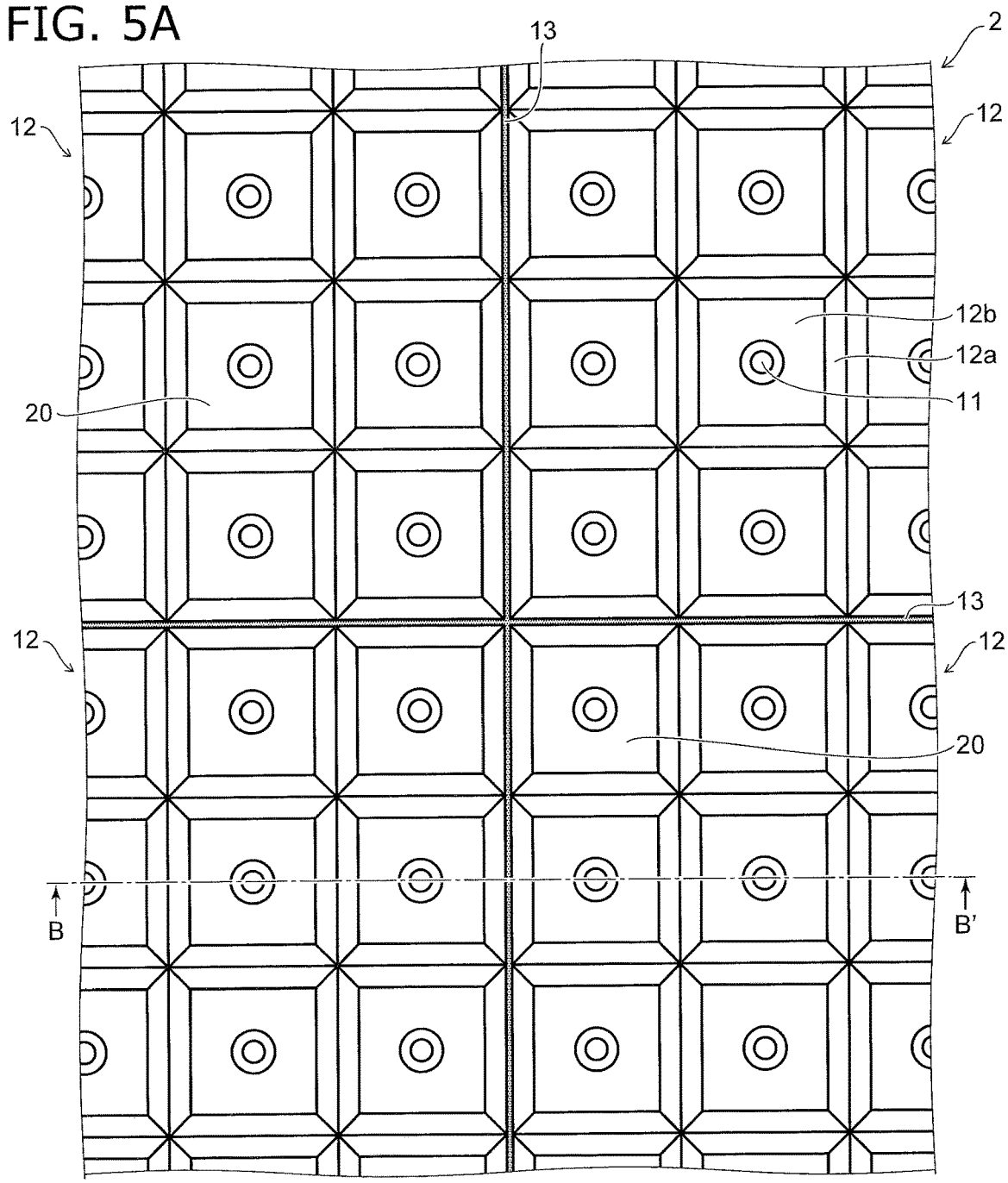
FIG. 5A is a plan view showing partitioning members and light-emitting elements of an image display device according to a second embodiment.
Figure 5B:
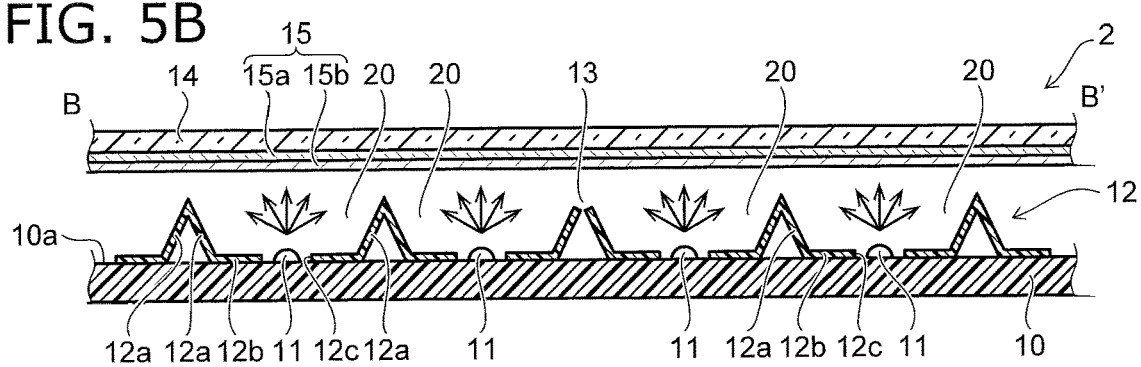
FIG. 5B is an end view along line B-B' shown in FIG. 5A.

FIG. 5A is a plan view showing partitioning members and light-emitting elements of an image display device according to the embodiment; and FIG. 5B is an end view along line B-B' shown in FIG. 5A.

In the image display device 2 according to the embodiment as shown in FIG. 5A and FIG. 5B, the configuration of each of the partitioning members 12 is a rectangle; and the multiple partitioning members 12 are arranged in a matrix configuration on the circuit board 10. In such a case, the discontinuous portion 13 has a lattice configuration when viewed in top-view. In the image display device 2, a correction similar to that of the first embodiment is performed in the two directions in which the partitioning members 12 are arranged.

Otherwise, the configuration, the control method, and the effects of the embodiment are similar to those of the first embodiment described above.

Third Embodiment

Figure 6A:
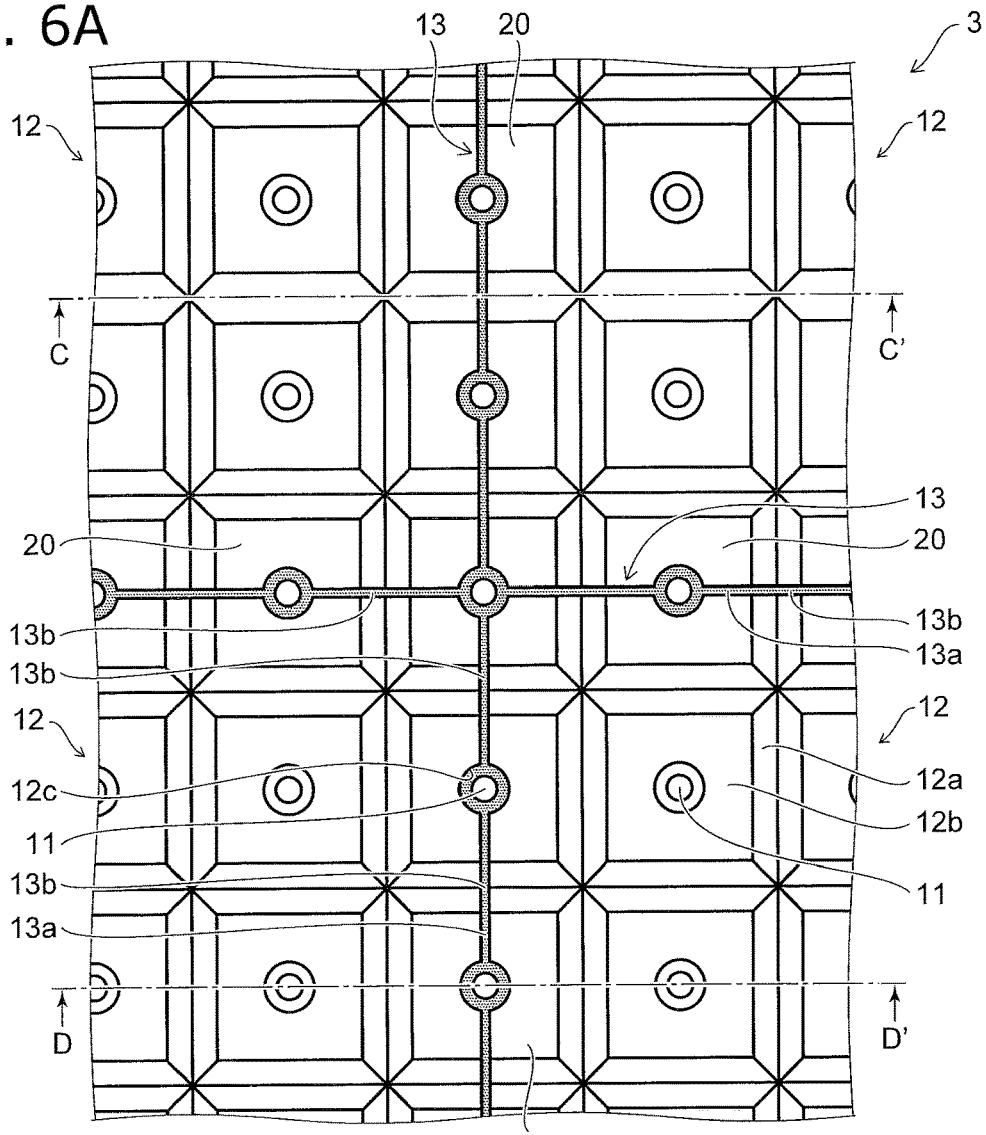
FIG. 6A is a plan view showing partitioning members and light-emitting elements of an image display device according to a third embodiment.
Figure 6B:
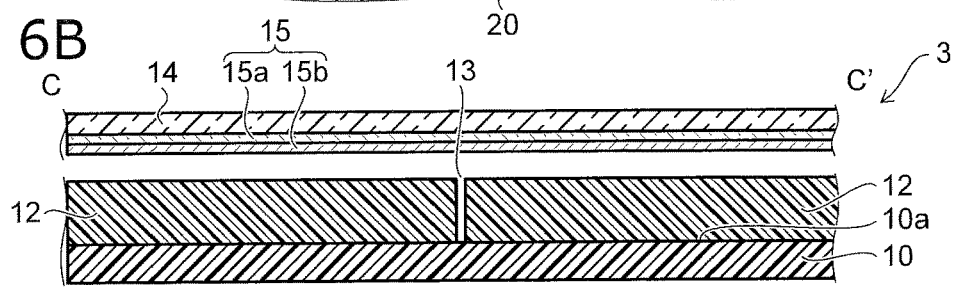
FIG. 6B is an end view along line C-C' shown in FIG. 6A.

FIG. 6A is a plan view showing partitioning members and light-emitting elements of an image display device according to the embodiment; FIG. 6B is an end view along line C-C' shown in FIG. 6A; and FIG. 6C is an end view along line D-D' shown in FIG. 6A.

Figure 6C:
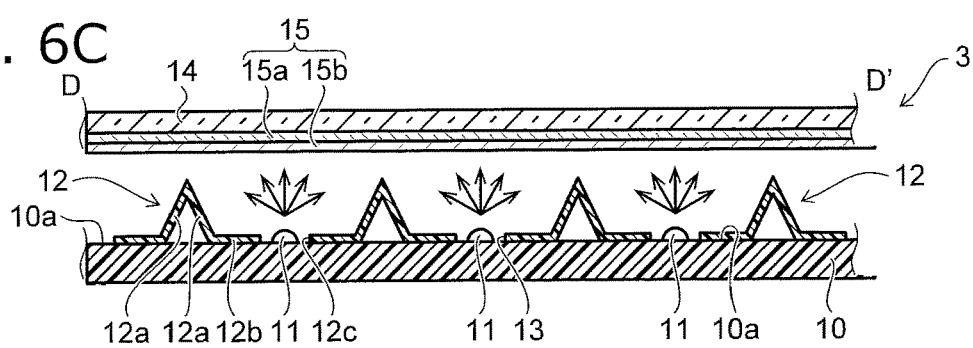
FIG. 6C is an end view along line D-D' shown in FIG. 6A.

In the image display device 3 according to the embodiment as shown in FIG. 6A to FIG. 6C, the discontinuous portion 13 is positioned in the space 20. Also, a portion of the light-emitting elements 11 is disposed in the discontinuous portion 13. In the embodiment as well, similarly to the second embodiment, the configuration of each of the partitioning members 12 is a rectangle; and the multiple partitioning members 12 are arranged in a matrix configuration on the circuit board 10. Therefore, the discontinuous portion 13 has a lattice configuration when viewed in top-view. In the embodiment, the portion of the discontinuous portion 13 positioned in the space 20 is taken as an "in-space portion 13a"; and the portion of the discontinuous portion 13 positioned between the adjacent spaces 20 is taken as an "outside-space portion 13b". The outside-space portion 13b includes the point where the discontinuous portion 13 and the ridgeline of the partitioning member 12 cross, and the region around the point.

A method for controlling the image display device 3 according to the embodiment will now be described.

Figure 7:
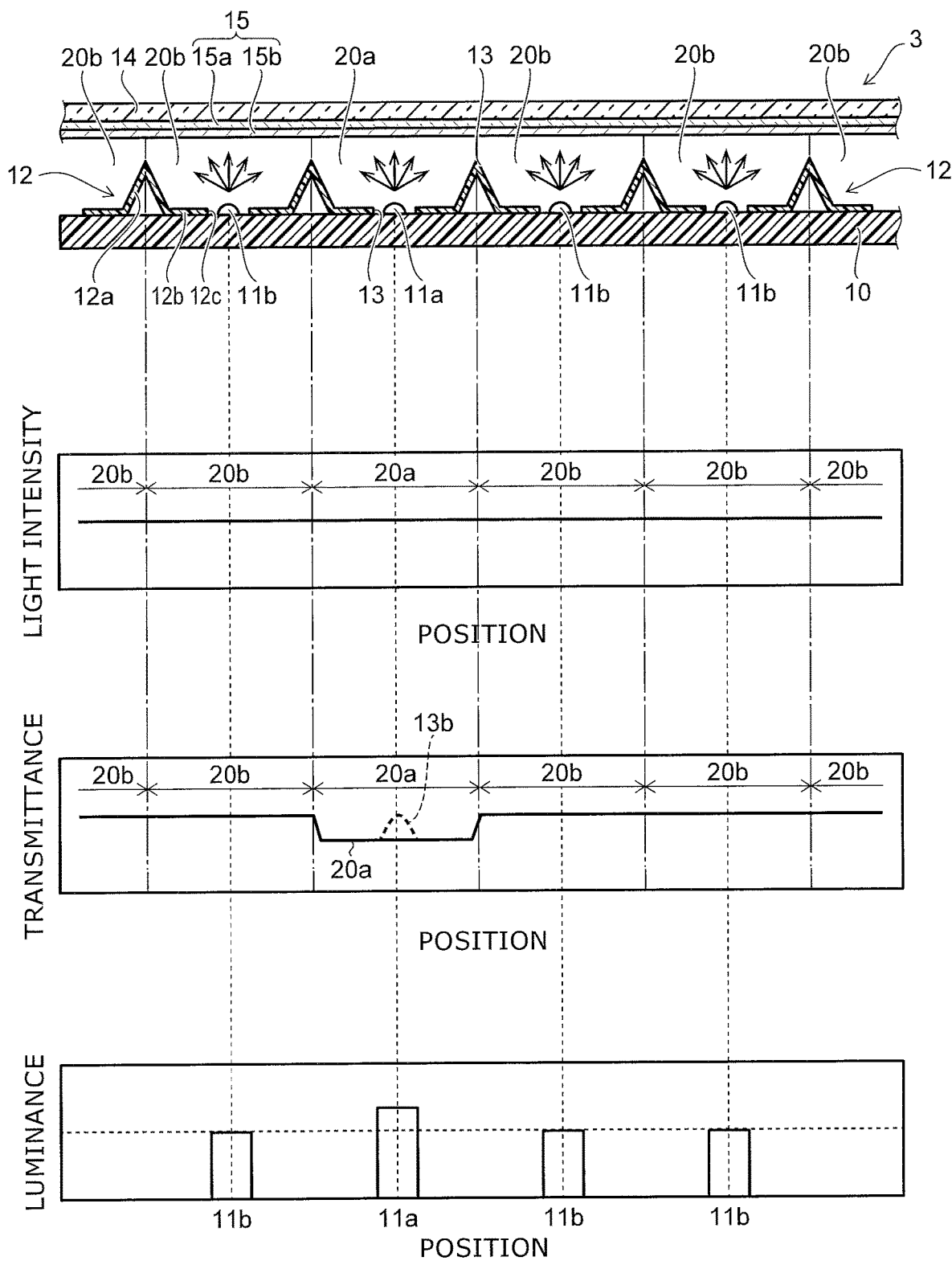
FIG. 7 shows a method for controlling the image display device according to the third embodiment, in which the horizontal axis is position, and the vertical axis is intensity of light emitted from the image display device, transmittance for light of pixels of a liquid crystal panel, and luminance of the light-emitting elements.

FIG. 7 shows the method for controlling the image display device according to the embodiment, in which the horizontal axis is the position, and the vertical axis is the intensity of the light emitted from the image display device, the transmittance for the light of the pixels of the liquid crystal panel, and the luminance of the light-emitting elements. The end view of the image display device 3 also is shown in FIG. 7.

In the embodiment, the space 20 that includes the discontinuous portion 13 is taken as the "space 20a"; and the other spaces 20 are taken as the "spaces 20b". The light-emitting element 11 that is disposed in the space 20a is taken as the "light-emitting element 11a"; and the light-emitting elements 11 that are disposed in the spaces 20b are taken as the "light-emitting elements 11b". In the embodiment, for example, the light-emitting element 11a is disposed in the discontinuous portion 13.

Because the discontinuous portion 13 exists in the region of the liquid crystal panel 14 opposing the space 20a, the light that is incident by being reflected by the partitioning member 12 is low. The incident light is lower in the region of the discontinuous portion 13 opposing the outside-space portion 13b than in the region of the discontinuous portion 13 opposing the space 20a. Therefore, if no countermeasure is taken, the region of the display image opposing the space 20a is darker than the other regions. The region of the discontinuous portion 13 opposing the outside-space portion 13b becomes even darker than the region opposing the space 20a.

Therefore, in the embodiment as shown in FIG. 7, the control circuit 31 of the image display device 3 sets the luminance of the light-emitting element 11a included in the space 20a to be higher than the luminance of the light-emitting elements 11b included in the spaces 20b. The decrease of the reflected light of the partitioning member 12 due to the existence of the discontinuous portion 13 is compensated thereby.

Also, the control circuit 31 sets the transmittances of the pixels of the liquid crystal panel 14 opposing the outside-space portion 13b shown by the broken line in FIG. 7 to be higher than the transmittances of the pixels opposing the space 20a shown by the solid line in FIG. 7. Thereby, the region of the display image opposing the outside-space portion 13b is suppressed from being darker than the region opposing the space 20a.

At this time, the transmittances of the pixels are determined by the balance with the luminance of the light-emitting element 11a.

In the example shown in FIG. 7, the luminance of the light-emitting element 11a is set to be sufficiently high to be able to compensate the region opposing the outside-space portion 13b. In such a case, the transmittances of the pixels opposing the outside-space portion 13b are set to be about the same as the transmittances of the pixels opposing the spaces 20b; and the transmittances of the pixels opposing the space 20a are set to be lower than the transmittances of the pixels opposing the spaces 20b so that the region opposing the space 20a is not too bright.

On the other hand, the luminance of the light-emitting element 11a may be increased in line so that the region opposing the space 20a can be compensated. In such a case, the transmittances of the pixels opposing the space 20a are set to be about the same as the transmittances of the pixels opposing the spaces 20b; and the transmittances of the pixels opposing the outside-space portion 13b are set to be higher than the transmittances of the pixels opposing the space 20a to compensate the region opposing the outside-space portion 13b.

Or, the luminance of the light-emitting element 11a may be set to an intermediate luminance between the luminance that can compensate the region opposing the outside-space portion 13b and the luminance that can compensate the region opposing the space 20a. The balance between the transmittances of the pixels and such a luminance of the light-emitting element 11a can be adjusted by considering various circumstances. For example, this may be determined by a balance between the power consumption and the image quality, or may be determined according to the characteristics of the display image.

Thus, in the embodiment as well, by the luminances of the light-emitting elements 11 and the transmittances of the pixels of the liquid crystal panel 14 being operated in combination, the effects of the discontinuous portion 13 on the light distribution of the multiple light-emitting elements 11 can be reduced; and the intensity distribution of the light emitted from the liquid crystal panel 14 can be uniform.

Otherwise, the configuration and the effects of the embodiment are similar to those of the first embodiment described above.

Fourth Embodiment

Figure 8:
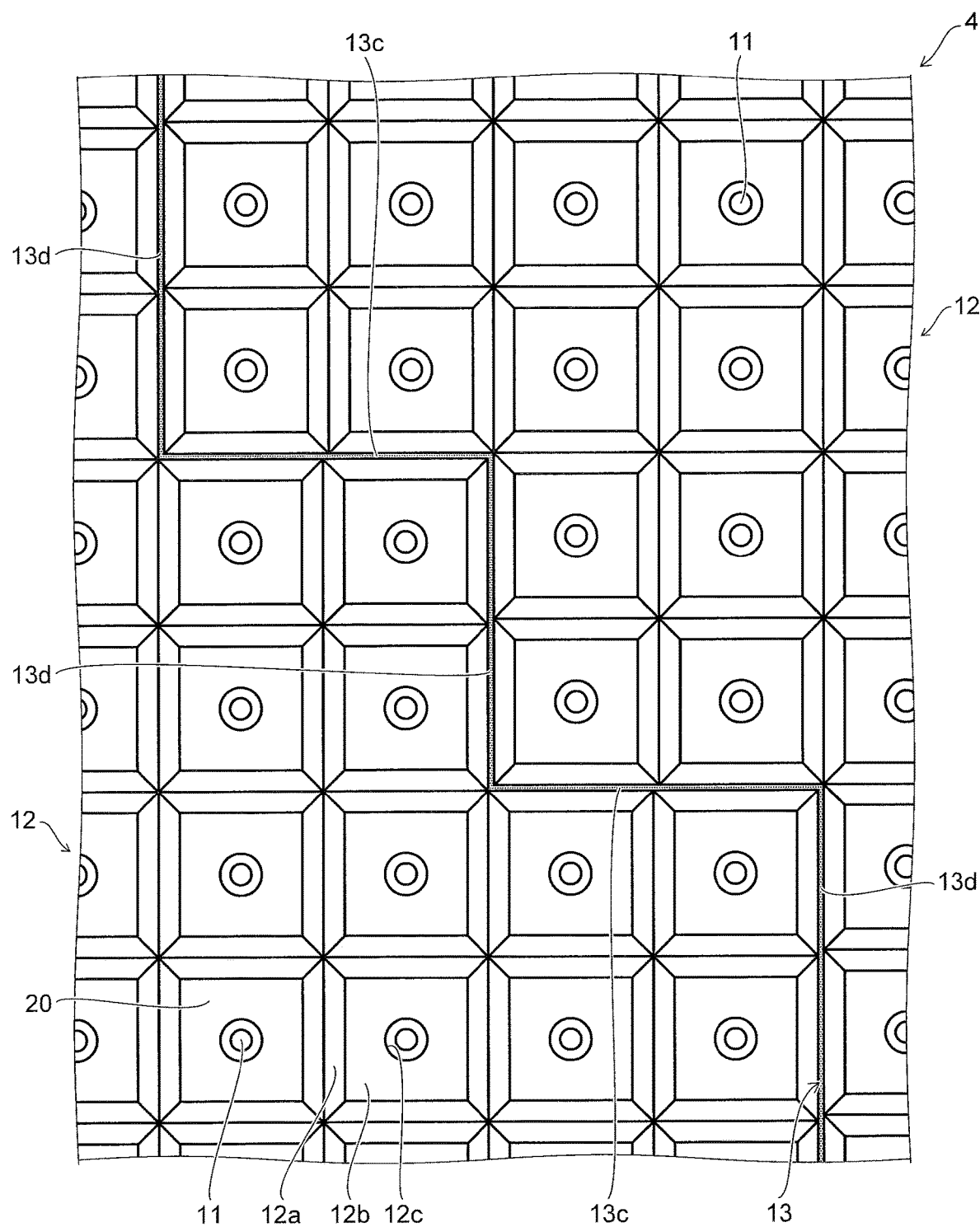
FIG. 8 is a plan view showing partitioning members and light-emitting elements of an image display device according to a fourth embodiment.

FIG. 8 is a plan view showing partitioning members and light-emitting elements of an image display device according to the embodiment.

In the image display device 4 according to the embodiment as shown in FIG. 8, the configuration of each of the partitioning members 12 is not a rectangle; and the discontinuous portion 13 extends in a zigzag. In other words, the discontinuous portion 13 includes a first portion 13c extending in a first direction which is the lateral direction in FIG. 8, and a second portion 13d extending in a second direction which is the vertical direction in FIG. 8. The second direction crosses, e.g., is orthogonal to, the first direction. One zigzagging discontinuous portion 13 is formed by connecting the first portion 13c and the second portion 13d in series.

Otherwise, the configuration, the control method, and the effects of the embodiment are similar to those of the first embodiment described above.

Fifth Embodiment

Figure 9A:
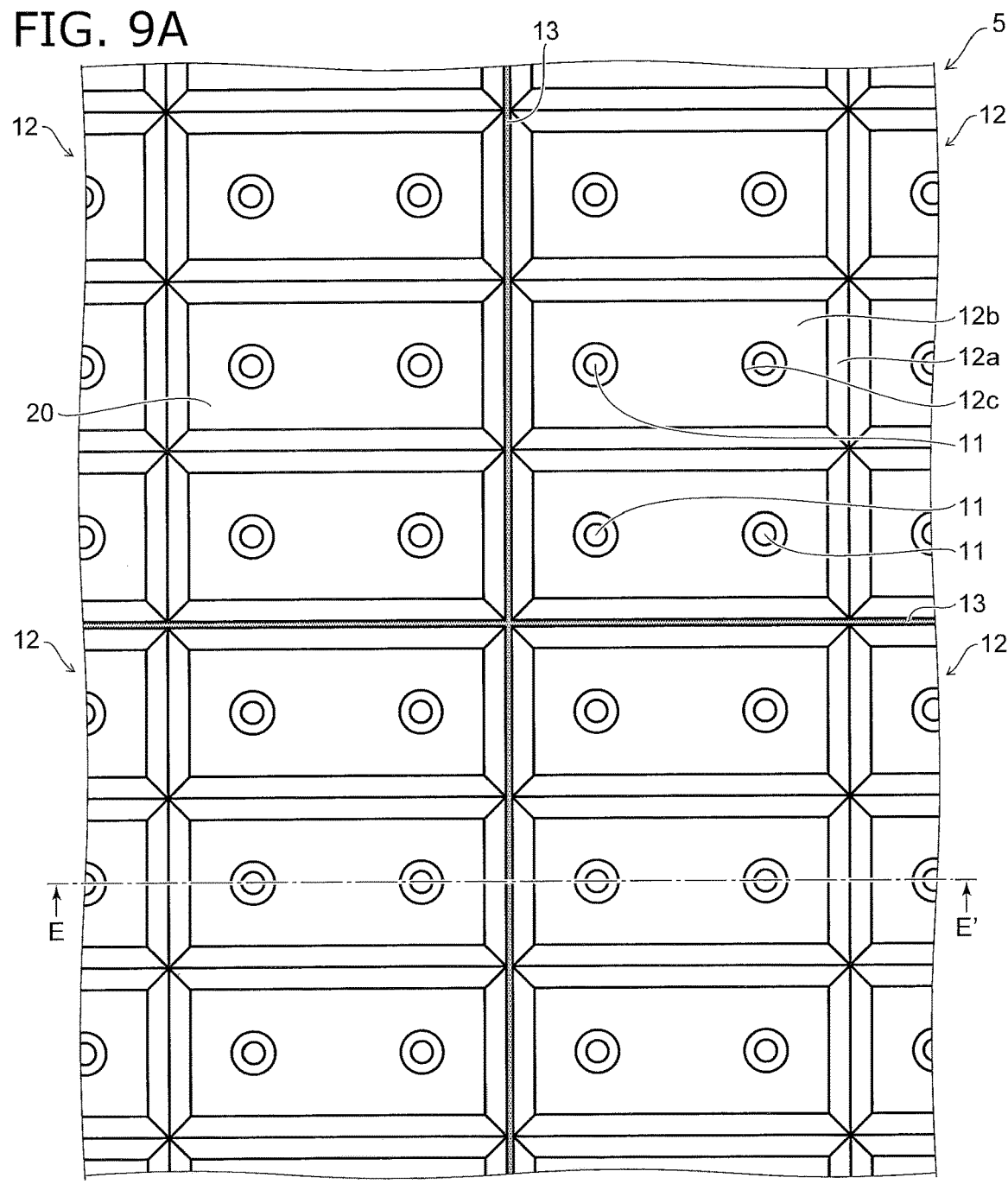
FIG. 9A is a plan view showing partitioning members and light-emitting elements of an image display device according to a fifth embodiment.
Figure 9B:
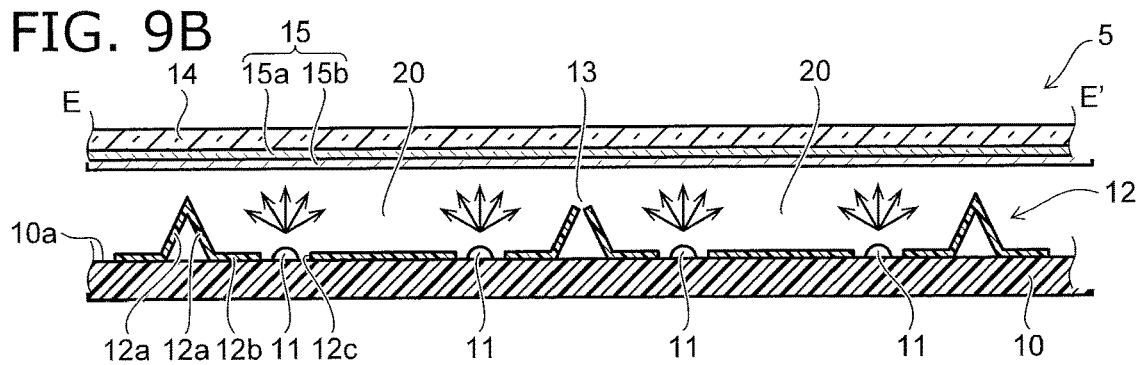
FIG. 9B is an end view along line E-E' shown in FIG. 9A.

FIG. 9A is a plan view showing partitioning members and light-emitting elements of an image display device according to the embodiment; and FIG. 9B is an end view along line E-E' shown in FIG. 9A.

In the image display device 5 according to the embodiment as shown in FIG. 9A and FIG. 9B, two light-emitting elements 11 are disposed in each of the spaces 20. In the image display device 5, the two light-emitting elements 11 included in the same space 20 are treated as one group and are controlled to have the same luminance.

Otherwise, the configuration, the control method, and the effects of the embodiment are similar to those of the first embodiment described above.

Sixth Embodiment

Figure 10A:
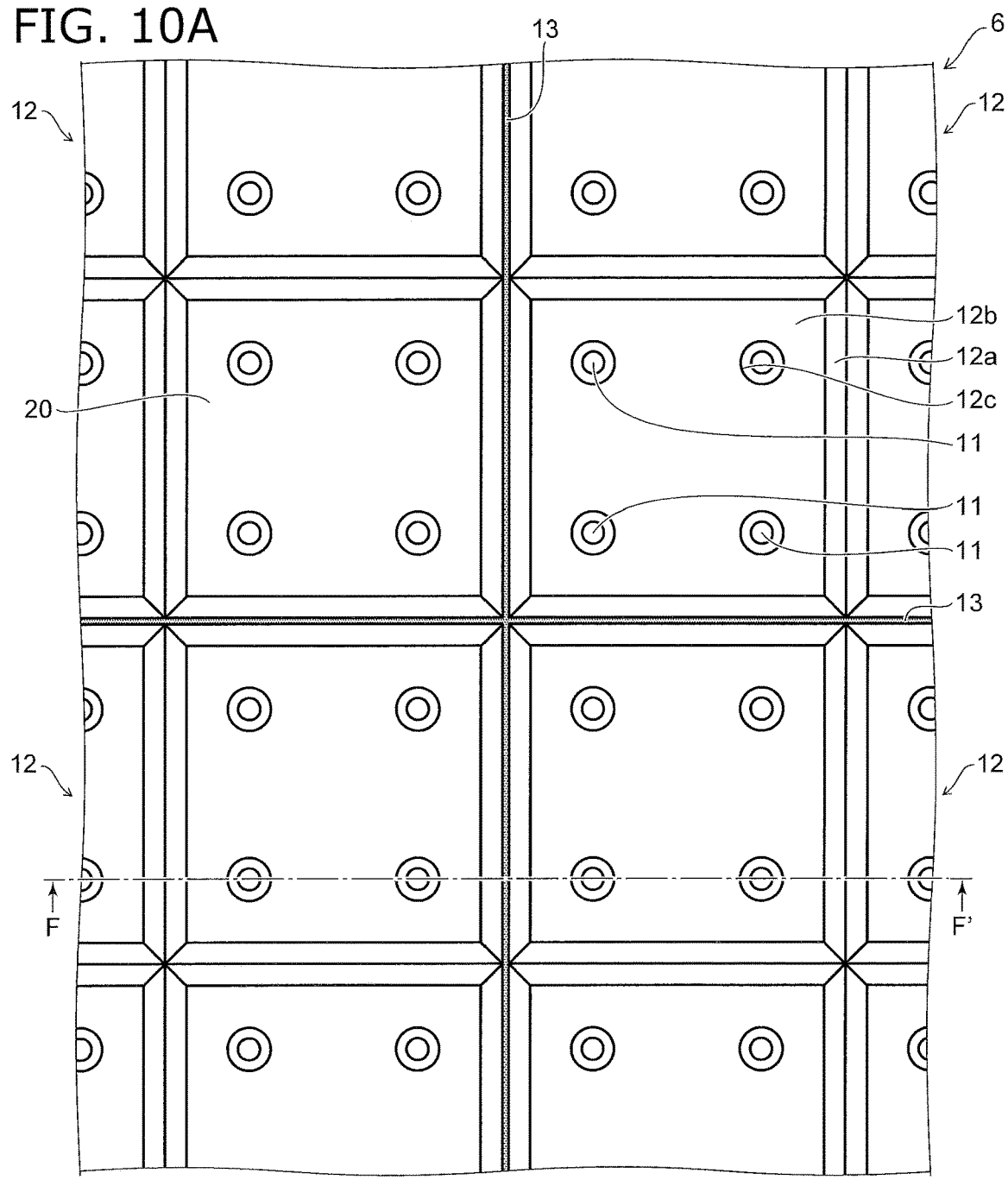
FIG. 10A is a plan view showing partitioning members and light-emitting elements of an image display device according to a sixth embodiment.
Figure 10B:
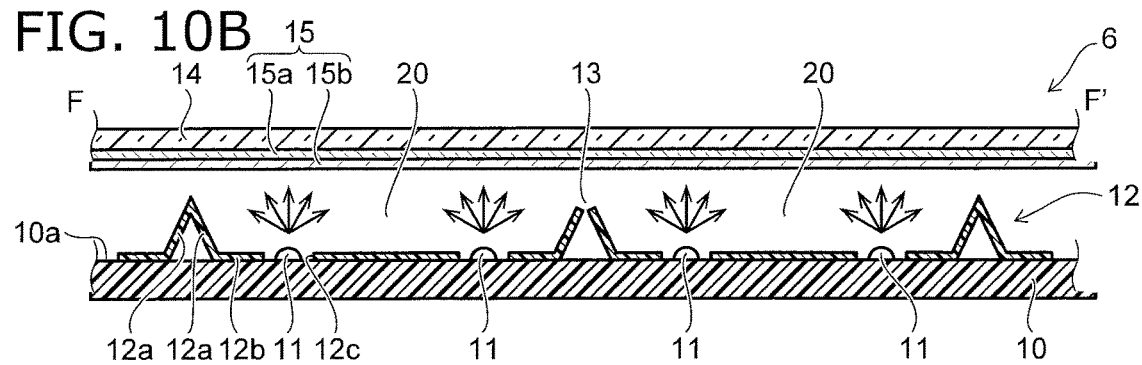
FIG. 10B is an end view along line F-F' shown in FIG. 10A.

FIG. 10A is a plan view showing partitioning members and light-emitting elements of an image display device according to the embodiment; and FIG. 10B is an end view along line F-F' shown in FIG. 10A.

In the image display device 6 according to the embodiment as shown in FIG. 10A and FIG. 10B, four light-emitting elements 11 are disposed in each of the spaces 20. For example, the four light-emitting elements 11 that are disposed in each of the spaces 20 are arranged in two rows and two columns. In the image display device 6, the four light-emitting elements 11 that are included in the same space 20 are treated as one group and are controlled to have the same luminance.

Otherwise, the configuration, the control method, and the effects of the embodiment are similar to those of the first embodiment described above.

Seventh Embodiment

Figure 11:
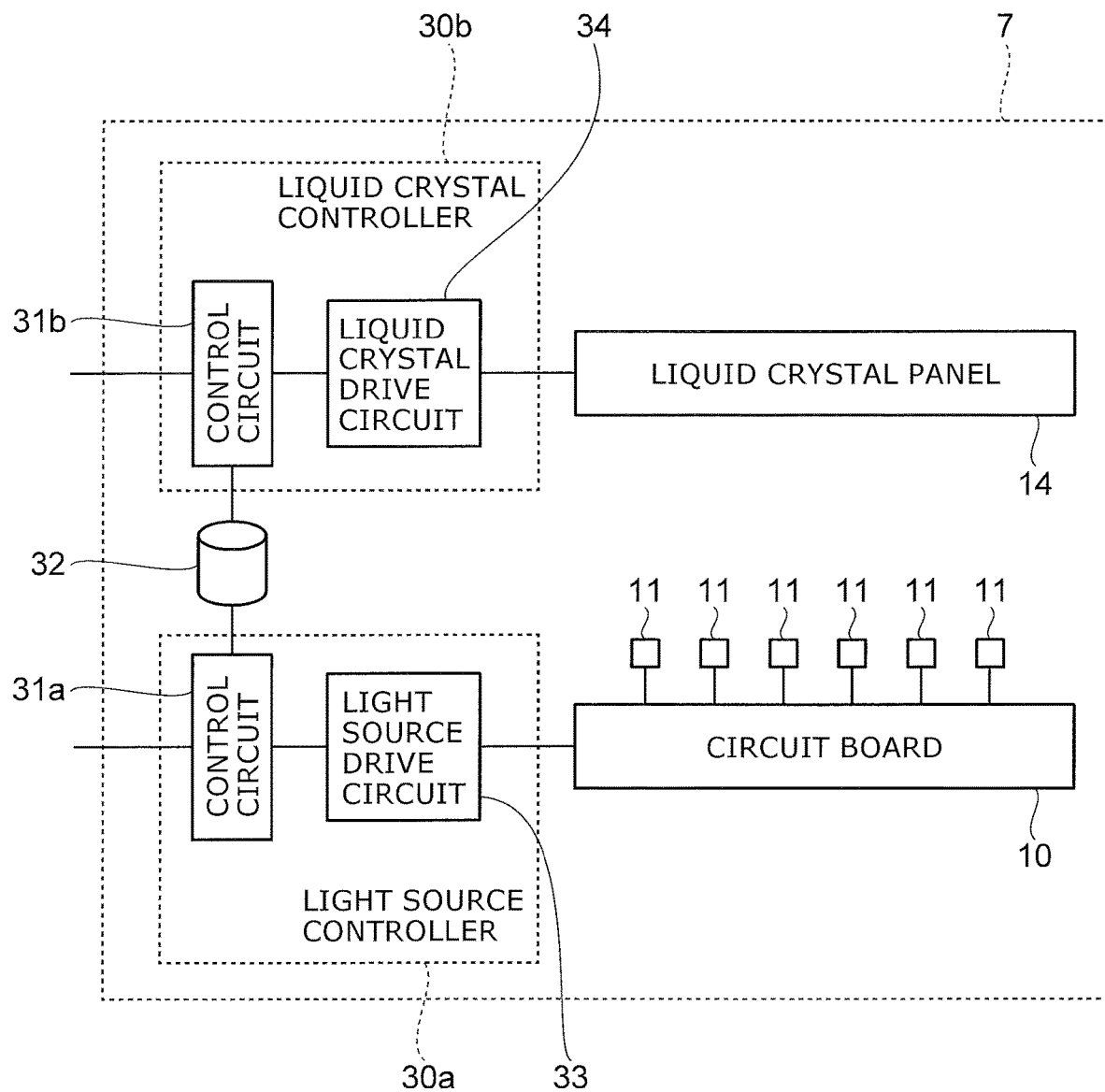
FIG. 11 is a block diagram showing an image display device according to a seventh embodiment.

FIG. 11 is a block diagram showing an image display device according to the embodiment.

In the image display device 7 according to the embodiment as shown in FIG. 11, a light source controller 30a that controls the light source and a liquid crystal controller 30b that controls the liquid crystal panel 14 are provided separately. The light source drive circuit 33 and a control circuit 31a on the light source side are provided in the light source controller 30a. The liquid crystal drive circuit 34 and a control circuit 31b on the liquid crystal side are provided in the liquid crystal controller 30b. The memory part 32 that is shared by the light source controller 30a and the liquid crystal controller 30b also is provided in the image display device 7. The information that relates to the position of the discontinuous portion 13 is stored in the memory part 32.

An image signal from the outside is input to the control circuit 31a on the light source side; and the control circuit 31a refers to the information stored in the memory part 32 and outputs a control signal to the light source drive circuit 33. Thereby, the control circuit 31a controls the light-emitting elements 11 to reduce the effects of the discontinuous portion 13 on the light distribution of the multiple light-emitting elements 11.

An image signal from the outside is input to the control circuit 31b on the liquid crystal side; and the control circuit 31b refers to the information stored in the memory part 32 and outputs a control signal to the liquid crystal drive circuit 34. Thereby, the control circuit 31b controls the liquid crystal panel 14 to reduce the effects of the discontinuous portion 13 on the light distribution of the multiple light-emitting elements 11.

Thus, in the image display device 7 according to the embodiment, by independently operating the control circuit 31a of the light source controller 30a and the control circuit 31b of the liquid crystal controller 30b, a control similar to that of the control circuit 31 of the first embodiment is realized; and the stripe-shaped unevenness that is caused by the discontinuous portion 13 is eliminated or reduced. The image signal that is input to the control circuit 31a on the light source side may be the same as or different from the image signal input to the control circuit 31b on the liquid crystal side. Otherwise, the configuration, the control method, and the effects of the embodiment are the same as those of the first embodiment described above.

Eighth Embodiment

Figure 12:
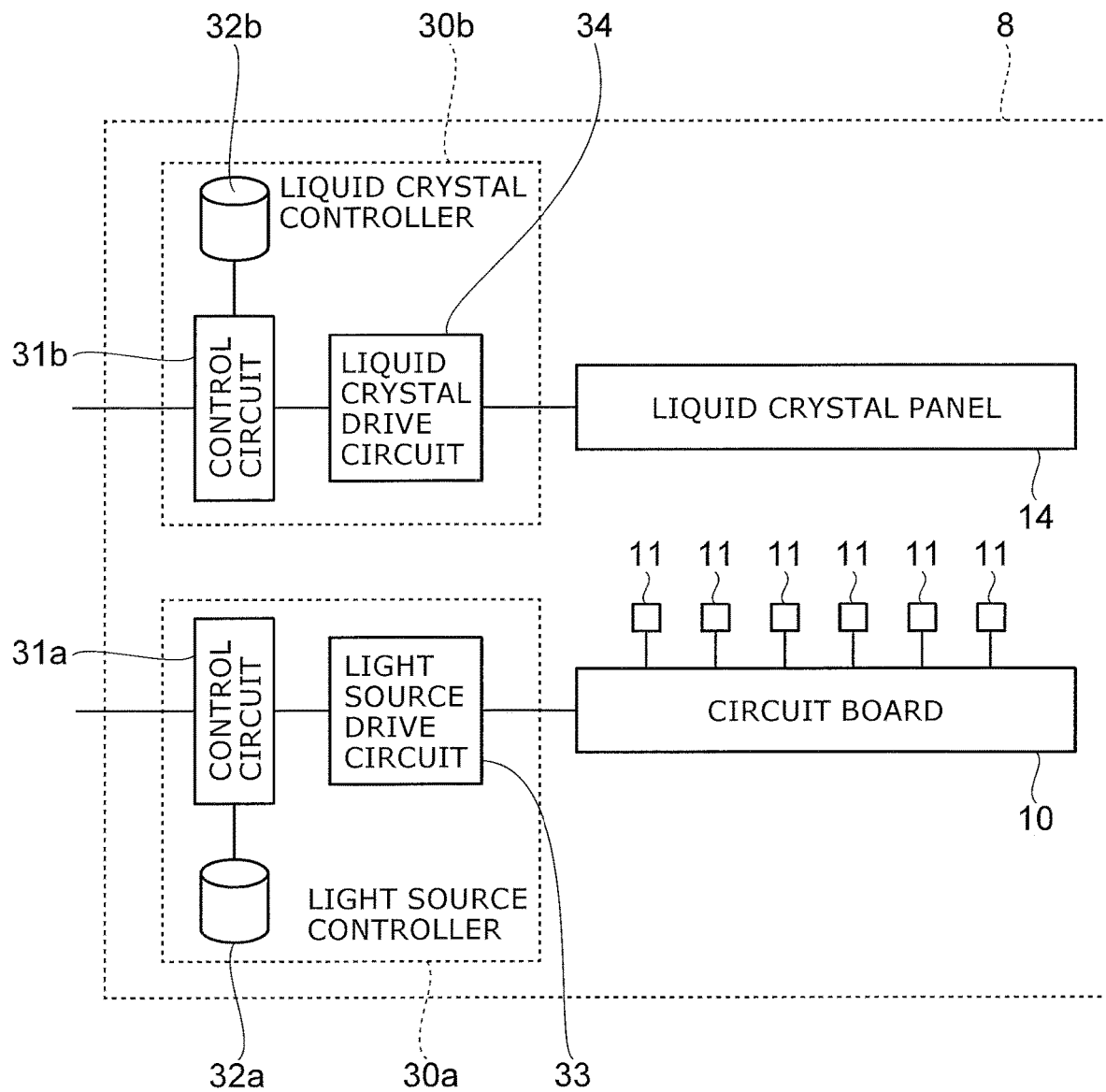
FIG. 12 is a block diagram showing an image display device according to an eighth embodiment.

FIG. 12 is a block diagram showing an image display device according to the embodiment.

In the image display device 8 according to the embodiment as shown in FIG. 12, a memory part 32a and a memory part 32b are respectively provided independently in the light source controller 30a and the liquid crystal controller 30b. The information that is stored in the memory part 32a and the information that is stored in the memory part 32b may be the same or may be different. Otherwise, the configuration, the control method, and the effects of the embodiment are similar to those of the seventh embodiment described above.

The embodiments described above can be implemented in combination with each other. For example, in an image display device in which the discontinuous portion 13 passes through the space 20 as in the third embodiment, the discontinuous portion 13 may extend in a zigzag as in the fourth embodiment, and the multiple light-emitting elements 11 may be disposed in each of the spaces 20 as in the fifth and sixth embodiments. Also, in an image display device in which the multiple light-emitting elements 11 are disposed in each of the spaces 20 as in the fifth and sixth embodiments, the discontinuous portion 13 may extend in a zigzag as in the fourth embodiment.

For example, the invention can be utilized in an image display device such as a television receiver, a home theater, etc.

What is claimed is:
1. An image display device, comprising:
a circuit board;
light-emitting elements mounted on the circuit board;
partitioning members reflecting light emitted from the light-emitting elements and forming spaces on the circuit board, one or more of the light-emitting elements being provided in each of the spaces to be surrounded by each of the partitioning members;
a discontinuous portion formed between the partitioning members;

a liquid crystal panel provided on the partitioning members and on the discontinuous portion; and
a control circuit configured to control the liquid crystal panel to reduce an effect of the discontinuous portion on a light distribution of the light-emitting elements,
wherein one of the partition members includes
a bottom plate having an opening, and
walls extending to the liquid crystal panel side from the bottom plate,
wherein one of the light-emitting elements is disposed in the opening, and
wherein the walls face the one of the light-emitting elements via one of the spaces and reflect light emitted from the one of the light-emitting elements toward the liquid crystal panel.

2. The image display device according to claim 1,
wherein the liquid crystal panel includes pixels,
wherein opposing pixels among the pixels are provided to be opposite to the discontinuous portion, and
wherein the control circuit is configured to increase light transmittances of the opposing pixels.

3. The image display device according to claim 1, wherein the control circuit is configured to control the light-emitting elements to reduce the effect of the discontinuous portion on the light distribution.

4. The image display device according to claim 3, wherein the control circuit is configured to increase a luminance of the light-emitting element disposed at a vicinity of the discontinuous portion.

5. An image display device, comprising:
a circuit board;
light-emitting elements mounted on the circuit board;
partitioning members reflecting light emitted from the light-emitting elements and forming spaces on the circuit board, one or more of the light-emitting elements being provided in each of the spaces to be surrounded by each of the partitioning members;
a discontinuous portion formed between the partitioning members;
a liquid crystal panel provided on the partitioning members and on the discontinuous portion; and
a control circuit configured to control the liquid crystal panel to reduce an effect of the discontinuous portion on a light distribution of the light-emitting elements,
wherein the control circuit is configured to control the light-emitting elements to reduce the effect of the discontinuous portion on the light distribution,
wherein the control circuit is configured to increase a luminance of the light-emitting element disposed at a vicinity of the discontinuous portion,
wherein the discontinuous portion is positioned between adjacent spaces of the plurality of spaces, and
wherein the control circuit is configured to increase luminances of the light-emitting elements disposed in the spaces sandwiching the discontinuous portion, reduces transmittances for the light of pixels of the liquid crystal panel opposing the spaces sandwiching the discontinuous portion, and sets a transmittance for the light of a pixel of the liquid crystal panel opposing the discontinuous portion to be higher than the transmittances for the light of the pixels opposing the spaces sandwiching the discontinuous portion.

6. An image display device, comprising:
a circuit board;
light-emitting elements mounted on the circuit board;
partitioning members reflecting light emitted from the light-emitting elements and forming spaces on the circuit board, one or more of the light-emitting elements being provided in each of the spaces to be surrounded by each of the partitioning members;
a discontinuous portion formed between the partitioning members;
a liquid crystal panel provided on the partitioning members and on the discontinuous portion; and
a control circuit configured to control the liquid crystal panel to reduce an effect of the discontinuous portion on a light distribution of the light-emitting elements,
wherein the control circuit is configured to control the light-emitting elements to reduce the effect of the discontinuous portion on the light distribution,
wherein the control circuit is configured to increase a luminance of the light-emitting element disposed at a vicinity of the discontinuous portion,
wherein the discontinuous portion is positioned in the space, and
wherein the control circuit is configured to increase a luminance of the light-emitting element disposed in the space including the discontinuous portion and sets, among pixels of the liquid crystal panel, a transmittance for the light of a pixel opposing a portion of the discontinuous portion positioned between the spaces to be higher than a transmittance for the light of a pixel opposing the space including the discontinuous portion.

7. The image display device according to claim 1, further comprising:
another control circuit configured to control the light-emitting elements to reduce the effect of the discontinuous portion on the light distribution.

8. The image display device according to claim 7, wherein the another control circuit is configured to increase a luminance of the light-emitting element disposed at a vicinity of the discontinuous portion.

9. The image display device according to claim 1, wherein the discontinuous portion includes a first portion extending in a first direction, and a second portion extending in a second direction crossing the first direction.

10. The image display device according to claim 1, further comprising:
an optical sheet provided between the liquid crystal panel and the partitioning members.

11. An image display device, comprising:
a circuit board having a surface;
partitioning members provided on the surface of the circuit board and forming spaces on the circuit board;
a discontinuous portion formed between the partitioning members;
light-emitting elements provided on the surface of the circuit board, at least one of the light-emitting elements being provided in each of the partitioning members to be surrounded by each of the partitioning members which is configured to reflect light emitted from the at least one of the light-emitting elements;
a liquid crystal panel provided on the partitioning members so that the partitioning members are provided between the liquid crystal panel and the surface of the circuit board; and
a control circuit configured to control the liquid crystal panel to improve uneven light distributions of the light-emitting elements caused by the discontinuous portion,
wherein one of the partition members includes
a bottom plate having an opening, and
walls extending to the liquid crystal panel side from the bottom plate, wherein one of the light-emitting elements is disposed in the opening, and wherein the walls face the one of the light-emitting elements via one of the spaces and reflect light emitted from the one of the light-emitting elements toward the liquid crystal panel.

12. The image display device according to claim 1, wherein a configuration of the bottom plate is rectangular, four of the walls are continuous with the bottom plate.

13. The image display device according to claim 1, wherein the discontinuous portion is located between two of the walls adjacent each other and is separated from the light-emitting elements.

* * * * *